May 15, 1962 S. A. OAKLEY 3,035,148
TUBE CUTTING APPARATUS
Filed June 1, 1959
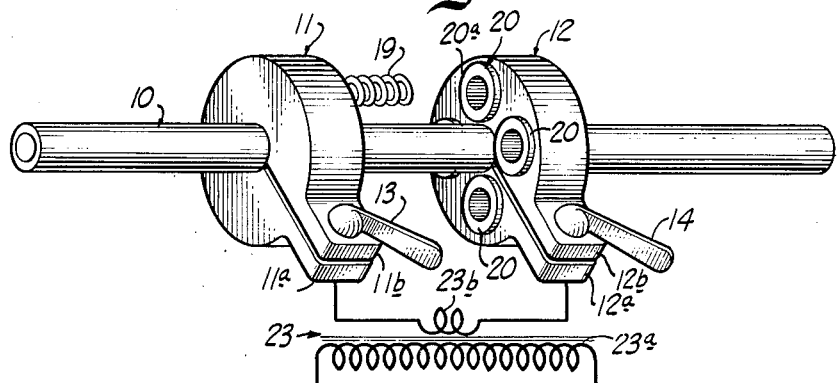
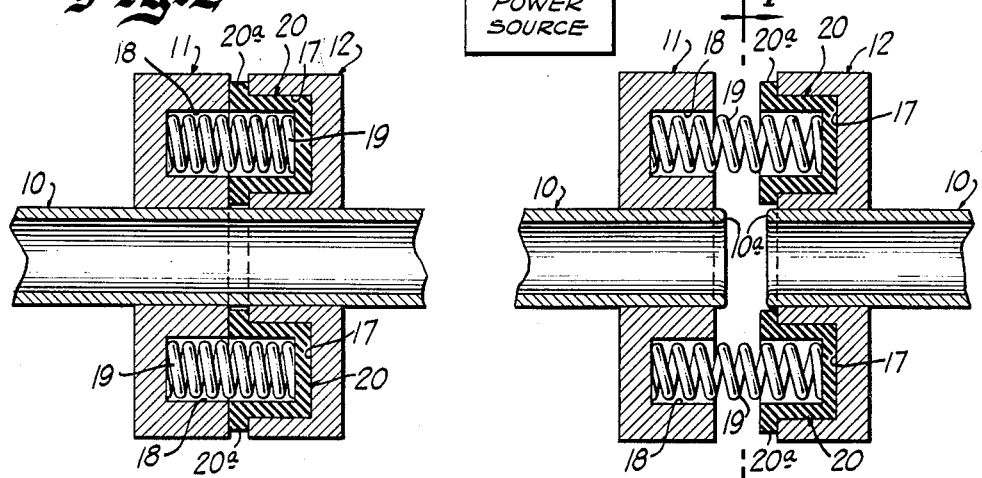
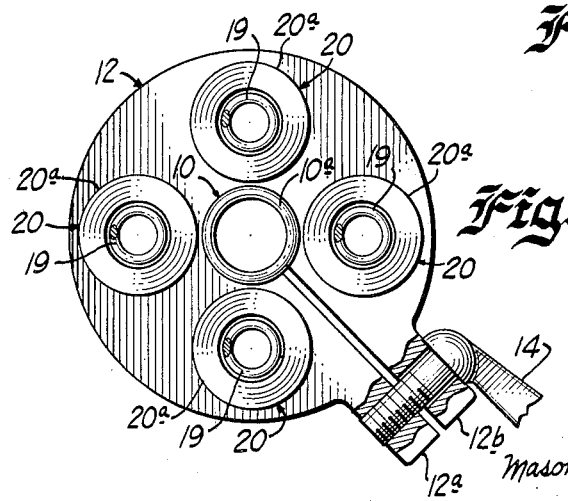
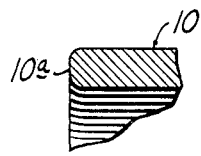
INVENTOR.
STERLING A. OAKLEY
BY Mason, Kolehmainen, Rathburn and Wyss
ATTORNEYS.

United States Patent Office
3,035,148
Patented May 15, 1962

3,035,148
TUBE CUTTING APPARATUS
Sterling A. Oakley, 6831 N. Kilpatrick Ave.,
Lincolnwood, Ill.
Filed June 1, 1959, Ser. No. 817,277
2 Claims. (Cl. 219—68)

The present invention relates to tube cutting apparatus and, more particularly, to an improved method and apparatus for cutting tubes into lengths without leaving any burrs.

Welded tubing is extensively used today for many purposes such as, for example, airplane struts, fluid carrying conduits and sheaths for electric heating elements. Such tubing is commonly constructed from an effectively endless strip of metal which is formed into a cylinder and welded along the abutting edges thereof to form a longitudinally welded seam.

Although the present invention is concerned with cutting tubing of all types in a burr-free manner, it is particularly well adapted for cutting tubing used as the sheaths of electric heating elements. Consequently, such specific application of the invention is described herein. However, it should be understood that this description is not by way of limitation but merely by way of example. Sheathed heating elements are commonly used in electric ranges, flat irons, cooking vessels, dryers and the like and comprise an outer metal sheath which houses therein a helical resistance wire. In order to support this resistance wire centrally of the sheath and in spaced insulated relationship therewith, the sheath is filled with a compacted mass of material which is a good electric insulator but at the same time a good heat conductor so that the heat from the resistance element is readily transmitted to the sheath. A common material used for this purpose is fused magnesium oxide. It will be apparent that the sheaths employed in connection with such sheathed heating elements must be formed of a material which will withstand high temperatures and which will not deteriorate when repeatedly subjected to such temperatures over long periods of time. Today many sheaths are commonly formed from a high nickel chromium alloy. One such alloy is sold on the market under the trademark "Inconel." "Inconel" contains roughly 80% nickel, 13% chromium and 6 to 7% iron. There are also materials as for example, "Incalloy," which has a lower nickel content somewhat of the order of 60% and which is also satisfactory for forming the sheath of sheathed heating elements.

Such sheaths as mentioned above are commonly formed from flat strip material which by suitable forming rollers is converted into the desired tubular shape. This results in tubing with an open seam and it is necessary to close the seam in the tubing thus formed which is commonly done by a seam-welding process. One arrangement for manufacturing such tubular elements particularly well adapted for use as sheaths of sheathed heating elements is disclosed and claimed in Oakley Patent No. 2,788,430, granted April 9, 1957.

In manufacturing such tubing with a welded seam, it is, of course, manufactured in a continuous process which means that the tubing is effectively endless. However, during the manufacturing process, it is necessary to cut the tubing to the various lengths desired depending upon the use to which it is put. In the case of electric heating elements, the sheaths may have a wide variety of lengths depending upon whether they are going to be used in a flat iron, an electric range, or with some other heating apparatus.

Prior to the present invention, the endless tubing passed through a cutting machine where it was cut to predetermined lengths as desired. This cutting machine resulted in the production of a burr and the tubing then had to go to a deburring machine to remove the burrs produced by the cutting operation. Additionally, chips formed by the cutting or deburring operation sometimes lodged in the tubing with very undesirable effects when it is considered that the tubing was used for the sheath of a resistance heating element.

This necessitated an additional step of making sure that all metal particles were removed from the tubing before it was shipped or at least employed in the manufacture of the heating element. It would be desirable to provide a method and apparatus whereby the endless tubing may be cut to lengths with a burr-free cutting mechanism so that the steps of deburring and cleaning may be completely eliminated.

Accordingly, it is an object of the present invention to provide a new and improved tube cutting machine.

It is another object of the present invention to provide an improved method and apparatus for cutting tubing without the production of any burrs.

Still another object of the present invention resides in the provision of an improved method of rapidly severing tubing into predetermined lengths in a burr-free manner.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawing in which:

FIG. 1 is a somewhat exploded perspective view illustrating apparatus for performing the burr-free cutting operation of the present invention;

FIG. 2 is an enlarged sectional view taken longitudinally of the tubing to be cut by the method and apparatus of the present invention showing the apparatus associated with the tube during one step of the process of the present invention;

FIG. 3 is a view similar to FIG. 2 showing a subsequent step in the process of the present invention;

FIG. 4 is a view taken on line 4—4 of FIG. 3 assuming that FIG. 3 shows the complete structure; and FIG. 5 is a greatly enlarged fragmentary view of the cut end of the tubing of the present invention showing the burr-free feature.

Briefly, the present invention is concerned with an arrangement for utilizing resistance heating to heat a short section of the tubing and simultaneously to apply a tension thereto to cause separation in a burr-free manner.

Referring now to the drawing, there is illustrated tubing generally designated at 10 which may be produced of any material and in any suitable manner in continuous lengths and which it is desired to cut to predetermined lengths without the formation of burrs during the cutting operation. In carrying out the method of the present invention, there are employed a pair of clamps 11 and 12 which are each provided with a central opening for receiving the tubing 10. As is clearly shown, these clamps 11 and 12 are illustrated as of somewhat C-shape having projecting lugs 11a and 11b, in the case of the clamp 11, and 12a and 12b, in the case of the clamp 12, together with suitable clamping means such as 13 for the clamp 11 and 14 for the clamp 12, whereby the clamps may be secured to the tubing. The clamping means 13 and 14 cause the associated lugs to move toward or away from each other as will readily be understood by those skilled in the art. The clamps 11 and 12 are formed of electrical conducting material and are preferably clamped to the tubing 10 with a relatively small space between the clamps of the order of one-half inch or less. In a device built in accordance with the present invention, the spacing between the two clamps 11 and 12 is of the order of one-sixteenth of an inch.

In order to apply a force to separate the tubing when it is cut by the burr-free tube cutting apparatus of the present invention, the clamp 12 is illustrated as being provided with a plurality of recesses 17 on the face adjacent to the clamp 11, four such recesses being shown. The clamp 11 is provided with similar recesses designated as 18. The recesses 17 and 18 are preferably aligned with each other so as to accommodate suitable coiled compression springs 19 which tend to force the clamps 11 and 12 apart. In order that the clamps 11 and 12 may be electrically insulated from each other, there are specifically illustrated cup-shaped insulating members 20 which are inserted into the recesses 17 thus insulating the springs 19 from the clamp 12 and, hence, insulating the clamp 11 from the clamp 12. These cup-shaped insulating members 20 are illustrated as having a circumferential flange 20a which, as clearly illustrated in FIG. 2 of the drawing, provides spacing means for spacing the two clamps. In the device built in accordance with the present invention, the flange 20a has a thickness of one-sixteenth of an inch thus providing a spacing between the clamps 11 and 12 of one-sixteenth of an inch. Obviously, a greater spacing to as much as a half-inch might be employed and also a smaller spacing than one-sixteenth of an inch might be employed.

It should be understood that it is not necessary to employ the recesses 17 and 18 in both clamps but, for example, only the recesses 18 might be employed receiving the springs 19 and the clamp 12 might have a flat surface secured to which is an insulating member of the order of one-sixteenth of an inch or thereabouts in thickness to provide the necessary spacing between the two clamps and also to provide a bearing surface for the other end of the springs 19 and insulate them from the clamp 12.

In accordance with the method and apparatus of the present invention, a source of electric power 22 is provided which is connected to a transformer 23 having a primary winding 23a and a secondary winding 23b. The source of power may be any suitable source of alternating current and the transformer 23 is preferably such as to produce a low voltage across the clamps 11 and 12 which might be of the order of two volts or less but to produce a high current which might be between five hundred and several thousand amperes depending on the size of tubing involved. This high current passing through the short section of tubing 10 between the clamps 11 and 12 causes resistance heating thereof and the springs 19 apply the necessary force to separate the tubing, as clearly shown in FIG. 3 of the drawing, when the necessary heating has taken place. For cutting a three-eighths inch heating element sheath having a wall thickness of 0.035 of an inch, satisfactory burr-free cutting was obtained with a current of 650 amperes. FIG. 5 is an enlarged fragmentary view which shows the tubing at the cut edge and clearly shows the burr-free cutting action that has taken place by virtue of the method and apparatus of the present invention.

It will be appreciated that the cut end 10a, which is essentially the same at either side of the severed tube, is such that no further work needs to be done to remove any burr or the like which was heretofore necessary.

It will be appreciated that numerous modifications may be made. For example, instead of employing forces only parallel with the longitudinal axis of the tubing 10 to be severed, some camming arrangement causing an additional twisting action of some sort might be employed. Thus, some threaded arrangement may be used where, in addition to forces parallel to the longitudinal axis, some twisting action is also involved. Likewise, mechanism may be provided for the clamps 11 and 12 to operate them automatically and at high speed as far as clamping and unclamping is concerned so that the cutting action may be adapted to a continuous process.

While there has been illustrated and described a particular embodiment of the method and apparatus of the present invention, it will be appreciated that numerous changes and modifications will occur to those skilled in the art and it is intended in the appended claims to cover all those changes and modifications as fall within the true spirit and scope of the present invention.

What is claimed as new and desired to be secured by Letters Patent of the United States is:

1. Apparatus for cutting tubing into lengths without leaving a burr comprising, first clamping means for electrically contacting said tubing, second clamping means for electrically contacting said tubing at a position spaced from said first clamping means, means for causing a high current to flow through said tubing between said clamping means to cause heating of the section of said tubing between said clamping means, and compression spring means interposed between said first and second clamping means for continuously applying a force to said tubing to sever the same between said clamping means.

2. Apparatus for cutting tubing into lengths without leaving a burr comprising, first clamping means for electrically contacting said tubing, second clamping means for electrically contacting said tubing at a position spaced from said first clamping means, means for causing a high current to flow through said tubing between said clamping means to cause heating of the section of said tubing between said clamping means, spring means interposed between said clamping means for applying a continuous tensile force to said tubing to sever the same between said clamping means, and means for electrically insulating said spring means from said clamping means.

References Cited in the file of this patent

UNITED STATES PATENTS

| 2,507,817 | Ropp et al. | May 16, 1950 |
| 2,606,266 | Duch et al. | Aug. 5, 1952 |

FOREIGN PATENTS

| 379,390 | Great Britain | Sept. 1, 1932 |
| 979,200 | France | Dec. 6, 1950 |
| 220,338 | Australia | July 18, 1957 |